United States Patent [19]
Breen et al.

[11] 4,223,615
[45] Sep. 23, 1980

[54] LOW NOX COAL BURNER

[75] Inventors: Bernard P. Breen; Arlen W. Bell, both of Laguna Beach, Calif.

[73] Assignee: KVB, Inc., Irvine, Calif.

[21] Appl. No.: 931,457

[22] Filed: Aug. 7, 1978

Related U.S. Application Data

[63] Continuation of Ser. No. 707,772, Jul. 22, 1976, abandoned.

[51] Int. Cl.³ .............................................. F23D 1/02
[52] U.S. Cl. .................................... 110/264; 110/347; 431/8; 431/183
[58] Field of Search .............. 431/182, 183, 184, 185, 431/8, 9; 110/264, 265, 104 R, 347

[56] References Cited

U.S. PATENT DOCUMENTS

| | | | |
|---|---|---|---|
| 1,817,911 | 8/1931 | Andrews et al. | 431/183 |
| 1,828,465 | 10/1931 | Haynes | 110/104 R |
| 2,158,521 | 5/1939 | Hahigyan | 431/185 |
| 3,944,142 | 3/1976 | Welden et al. | 239/552 |

FOREIGN PATENT DOCUMENTS

| | | | |
|---|---|---|---|
| 735331 | 5/1943 | Fed. Rep. of Germany | 110/104 R |
| 334755 | 9/1930 | United Kingdom | 110/104 R |

*Primary Examiner*—Edward G. Favors
*Attorney, Agent, or Firm*—Blakely, Sokoloff, Taylor & Zafman

[57] ABSTRACT

An improved burner for reducing formation of nitric oxide in pulverized fuel furnaces, particularly coal furnaces. Aerodynamic spoilers extend into the wake of the primary air and fuel line to produce fuel-rich and air-rich zones near the burner. Less near-burner adiabatic combustion occurs and that which does occur, occurs fuel-rich. This reduces both the thermal formation of $NO_x$ and the chemically bound fuel nitrogen conversion to $NO_x$. The improved apparatus may be readily added to existing burners with a minimum of modification, or incorporated into new burner designs.

14 Claims, 21 Drawing Figures

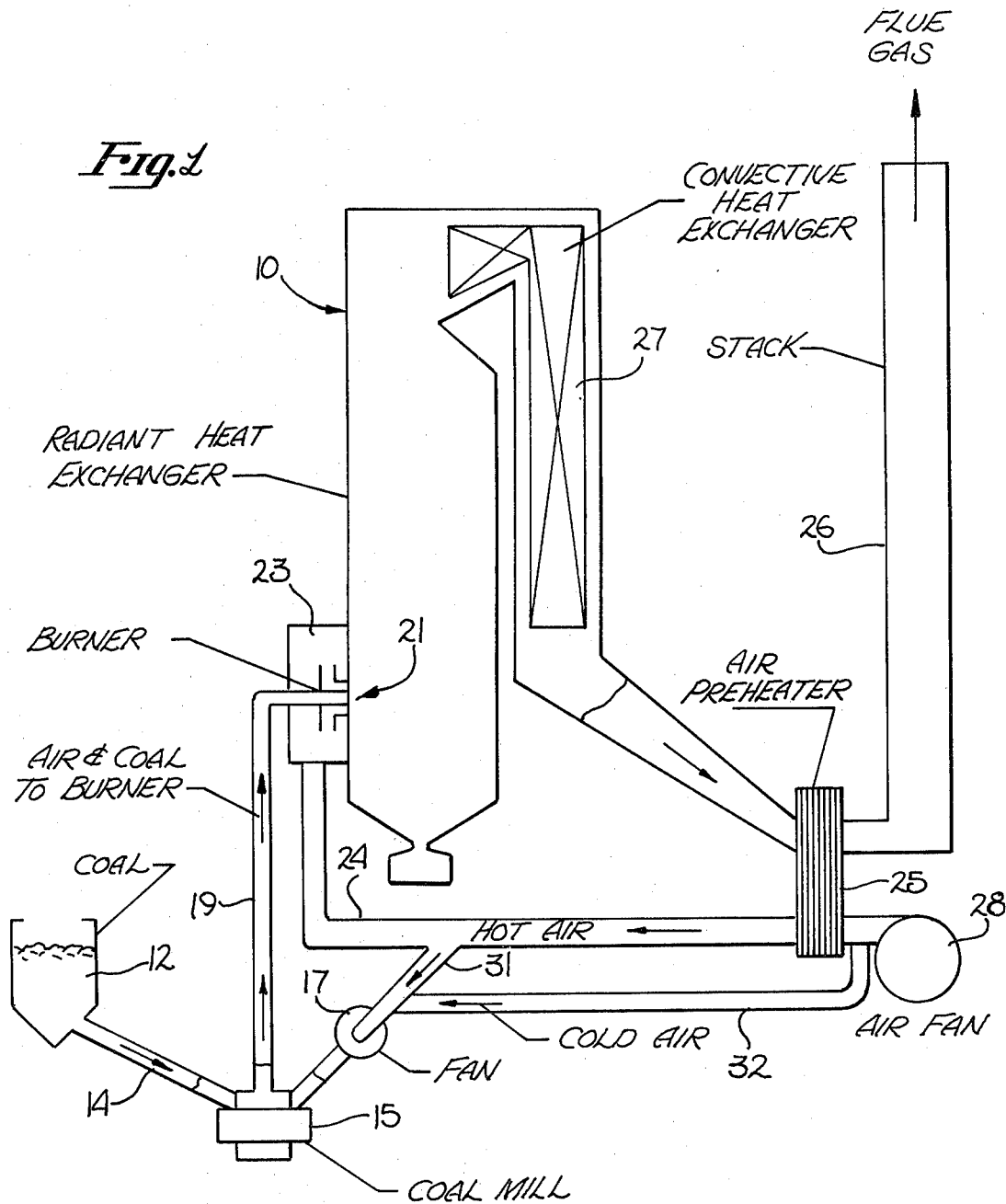

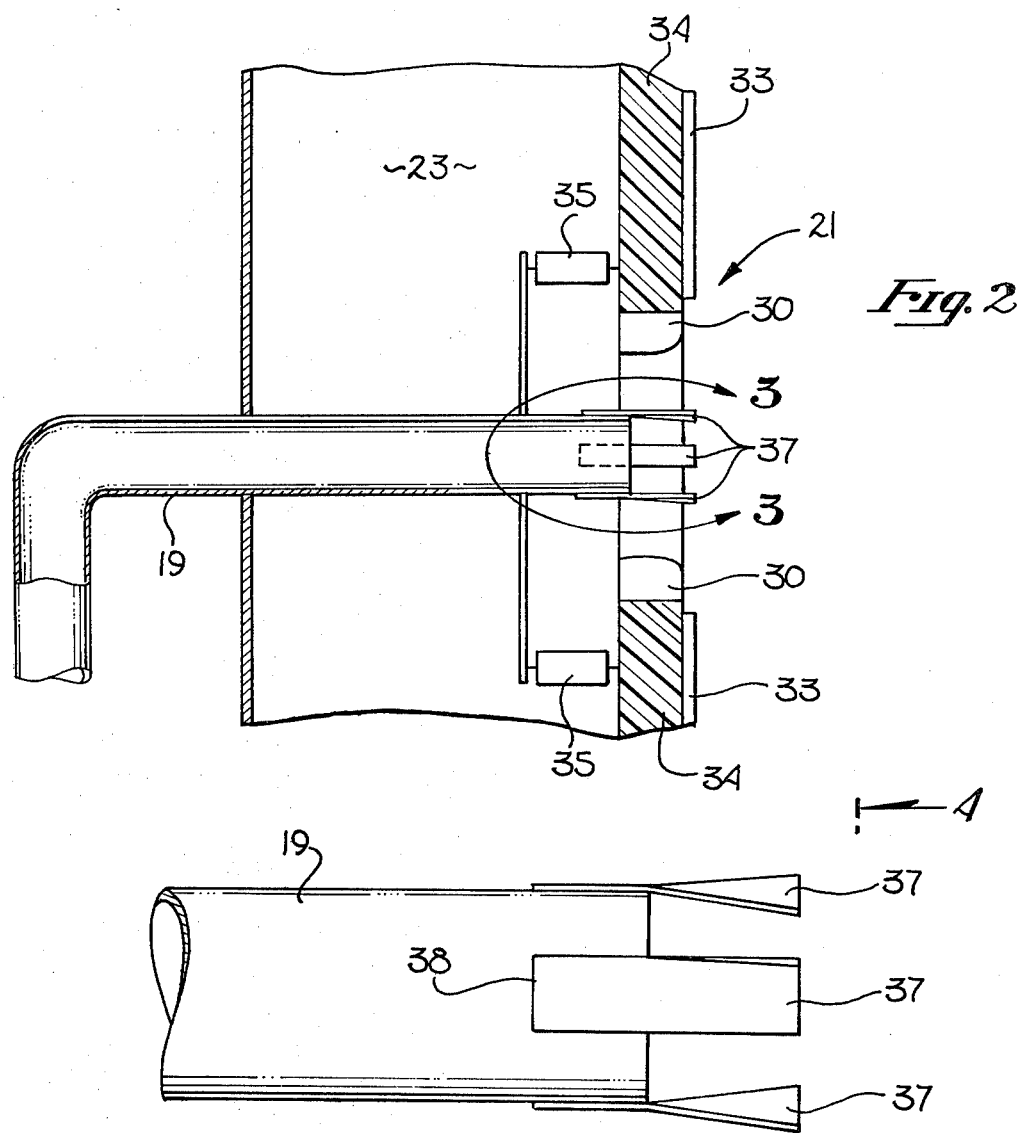
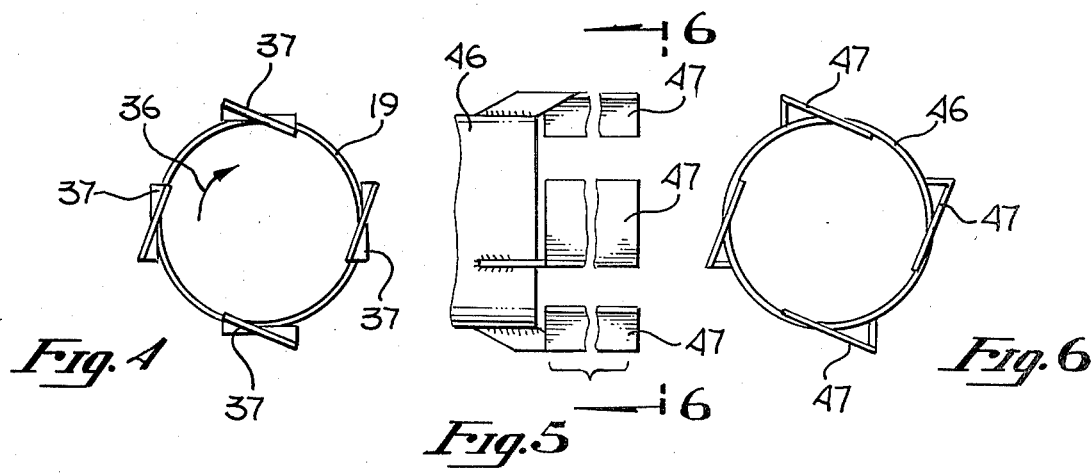

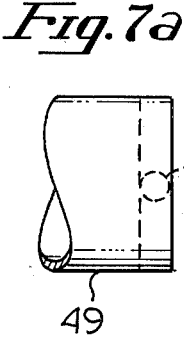
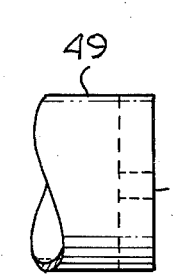
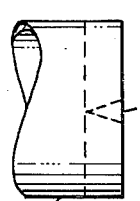
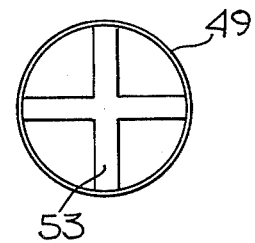
Fig. 7a  Fig. 7b  Fig. 7c  Fig. 7d  Fig. 8
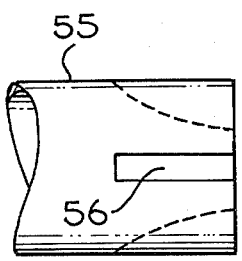
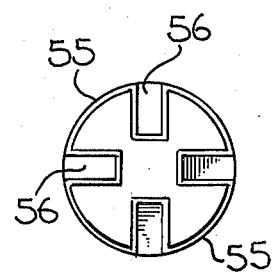
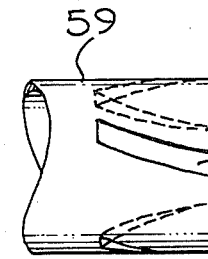
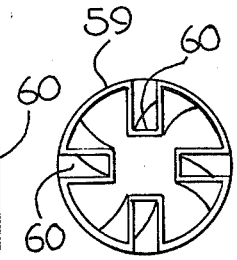
Fig. 9  Fig. 10  Fig. 11  Fig. 12
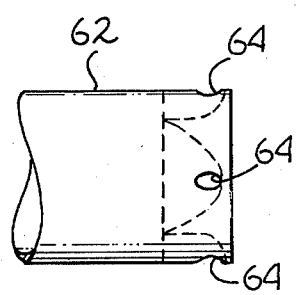
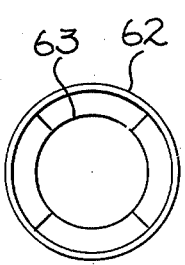
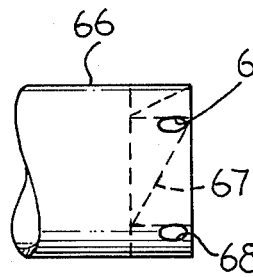
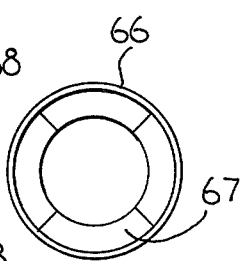
Fig. 13  Fig. 14  Fig. 15  Fig. 16
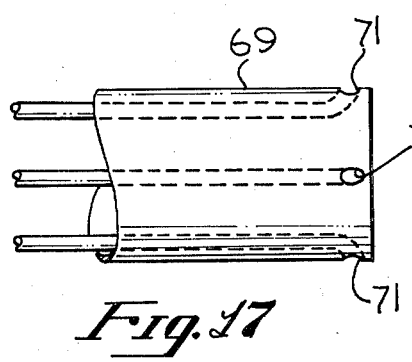
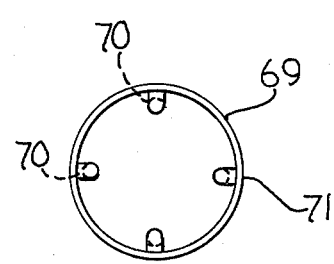
Fig. 17  Fig. 18

LOW NOX COAL BURNER

This is a continuation of application Ser. No. 707,772, filed July 22, 1976 now abandoned.

BACKGROUND OF THE INVENTION

1. Field of the Invention

The invention relates to the field of pulverized fuel burners, particularly pulverized coal burners.

2. Prior Art

Recently, a trend has begun towards employing more coal, particularly for utilities. This trend has been brought about because of the abundance of coal, particularly in the United States, and current problems in supplying ample quantities of natural gas and oil.

Because of the present day recognition of pollution hazards, large consumers of fossil fuels are required to meet specified emission standards. among the pollutants which must be controlled are oxides of nitrogen, such as nitric oxide (NO) and nitrogen dioxide ($NO_2$), collectively referred to as nitric oxides ($NO_x$). The nitric oxides are a strong public concern since in the form of $NO_2$ they produce a visible brownish gas obscuring visibility, and combining with reactive hydrocarbons to form photochemical "smog" and/or possibly carcinogenic nitrites and nitrates.

Some attention has been given to the reduction of $NO_x$ in coal-fired furnaces. In U.S. Pat. No. 3,788,796 a pulverized fuel burner is described which provides means for reducing $NO_x$. By maintaining a fuel-rich core, surrounded by combustion air, for a considerable distance from the burner, formation of $NO_x$ is reduced. Although this device provides satisfactory operation, it is complex, requires regular maintenance, and is not adaptable for existing burners, but rather requires an entire new burner.

In contrast, as will be described in detail, the improved burner of the present invention may be readily installed on existing burners, with minimum expense. Aerodynamic spoilers are employed on the primary air and fuel line to produce separate fuel-rich and air-rich zones.

In other prior art, vanes, and the like, have been employed primarily for providing efficient, thorough mixing of the pulverized coal and air. For example, in U.S. Pat. No. 2,755,750 a plurality of whirlers each of which includes fixed vanes, are used to thoroughly mix air, fuel and burnt gases. In contrast, the presently disclosed apparatus does not attempt to provide a uniform mixing, but rather to create fuel-rich and fuel-poor regions for the purpose of achieving $NO_x$ control. Nitric oxide tends to form fastest in the hottest (adiabatic) regions of the flames; i.e. the near burner region before boiler heat removal. If these adiabatic regions are maintained fuel-rich in a controlled manner then the scarce oxygen will selectively combust the fuel rather than attack the nitrogen in the air. In a similar manner chemically bound fuel nitrogen will tend to decompose or react to $N_2$ in these same adiabatic, fuel-rich regions.

Fuel-rich/air-rich operation is currently employed in multi-burner natural gas and oil furnaces to reduce $NO_x$. In such operation some of the burners are fed with air only (no fuel) or air is introduced above the flame zone or at other places so that the operating burners are fuel-rich (insufficient air); this provides off-stoichiometric firing. In coal-fired furnaces the use of off-stoichiometric firing or "over-fire air ports" can result in severe slagging of the lower boiler walls due to the reduction in the ash fusion temperature when moving from an air-rich (oxidizing) region to a fuel-rich (reducing) region. With the presently described apparatus unusual slagging does not occur since the air/fuel and combustion products finally obtain an air-rich condition before impinging the boiler walls (i.e. only the high temperature adiabatic initial zone is made fuel-rich for lowered nitric oxide emissions).

SUMMARY OF THE INVENTION

An improved burner for reducing the formation of $NO_x$ in a pulverized fuel furnace such as a pulverized coal furnace is described. A plurality of aerodynamic spoilers or fingers are disposed about the burner end of the primary air and fuel line, into the wake of this line. These spoilers cause the fuel to be dispersed in generally radial rays about the line, and also in a core, aligned with the line. These rays and core provide fuel-rich zones which are surrounded by air-rich zones. These separate zones reduce near-burner combustion (intense adiabatic combustion) and consequently retard the formation of $NO_x$. This is achieved without affecting the flame stability. In the presently preferred embodiment, the finger-like spoilers extend beyond the end of the primary air and fuel line and define a constant angle or are helically shaped. Thus, the apparatus may be readily installed on existing burners, or new burner designs, without substantial modification and without the need for additional maintenance.

BRIEF DESCRIPTION OF THE DRAWINGS

FIG. 1 is a diagram illustrating a steam generator and its pulverized coal feeding system.

FIG. 2 is a partial, cross-sectional, elevation view of the burner section of the furnace of FIG. 1 and includes the spoilers of the present invention.

FIG. 3 is a partial exploded view of the primary air and fuel line of FIG. 2, taken through section line 3—3 of FIG. 2. This view is used to illustrate the spoilers coupled to the end of this line.

FIG. 4 is an end view of the line and spoilers illustrated in FIG. 3, taken along section line 4—4 of FIG. 3.

FIG. 5 is a partial elevation view of the end of a primary air and fuel line which includes constant angle spoilers.

FIG. 6 is an end view of the line and spoilers of FIG. 5, taken along section line 6—6 of FIG. 5.

FIGS. 7 through 18 illustrate alternate embodiments for the spoilers, particularly where the spoilers are incorporated within the end of the primary air and fuel line.

FIG. 7A is an elevation view of a line which includes cross blockage having a generally circular cross-section.

FIG. 7B is an elevation view of a primary air and fuel line which includes cross blockage having a generally rectangular crossection.

FIG. 7C is an elevation view of a primary air and fuel line which includes cross blockage having a generally angled cross-section.

FIG. 7D is an elevation of a primary air and fuel line which includes cross blockage having a generally contoured cross-section.

FIG. 8 is an end view of the line shown in FIGS. 7A through 7D.

FIG. 9 is an elevation view of a primary air and fuel line which employs slats as spoilers.

FIG. 10 is an end view of the line of FIG. 9.

FIG. 11 is an elevation view of a primary air and fuel line which employs helical slats as spoilers.

FIG. 12 is an end view of the line of FIG. 11.

FIG. 13 is an elevation view of a primary air and fuel line which includes scoop-like diverters.

FIG. 14 is an end view of the line of FIG. 13.

FIG. 15 is an elevation view of a primary air and fuel line which includes scoop-like diverters for providing a tangential flow.

FIG. 16 is an end view of the line of FIG. 15.

FIG. 17 illustrates a primary air and fuel line which includes a plurality of jet-like diverters; and FIG. 18 is an end view of the line of FIG. 17.

DETAILED DESCRIPTION OF THE INVENTION

An improved burner is described for reducing the formation of $NO_x$ in a pulverized fuel furnace. The improved burner, in its presently preferred embodiment, comprises a relatively simple modification to existing burners. Such existing burners are employed in large pulverized coal-fired furnaces (e.g., 200,000 lbs. of steam/hour, or larger).

Referring now to FIG. 1, a conventional boiler or steam generator 10 which includes a burner 21 is illustrated. The hot gases from the combustion portion of the furnace pass through a convective heat transfer section 27, through a heat exchanger 25, and then up the flue or stack 26. The majority of air required for combustion is forced by fan 28 through the heat exchange 25 where it is heated. This hot air passes along line 24 and into the wind box 23 which surrounds the burner 21. Some of this air is diverted into line 31 and mixed with cold air from line 32. This air is forced by the primary air fan 17 into the coal mill 15 where it is mixed with pulverized coal. The air/coal mixture is coupled to the burner 21 through the primary air and fuel line 19.

The coal for the steam generator, as illustrated in FIG. 1, is stored in a hopper 12 (or other storage means) and transported to the coal mill 15 via a conveyor belt or line 14. Mill 15 may be any one of a number of well-known mills for pulverizing the coal.

The various steam generator components shown in FIG. 1 such as the heat exchanger 25, fans 17 and 28, burner 21, wind box 23, and the remaining lines may be ordinary components, commercially available and presently in use.

In FIG. 2 the burner is again illustrated, however, with the improvement of the present invention. Again the wind box 23, and the primary air and fuel line 19 are illustrated. The line 19 terminates in the center of the burner throat; a ceramic ring 30 is disposed about the burner throat. In this view, water tubes 33 and insulation 34 are also illustrated. The secondary air from line 24 of FIG. 1 communicates with the interior of the wind box 23. The flow of this air into the burner is controlled by a plurality of adjustable air registers 35. It should be noted that numerous controls and components associated with such burners, such as flame shaping vanes and light-off unit are not shown in FIG. 2 since they are not required for an understanding of the present invention.

The improvement of the present invention in its presently preferred embodiment, comprises the finger-like spoilers 37 mounted at the burner end of the line 19. The spoilers may be welded to the line 19, such as by welds 38 of FIG. 3, or may be coupled to a collar which is secured to the end of line 19. The spoilers are disposed generally in alignment with line 19 and circumferentially and uniformly spaced-apart about this line. Any number of such spoilers may be employed, however, 2 to 6 are optimum. The length of the spoilers, beyond the end of the line, in the presently preferred embodiment, is between ¼ to 1.5 times the inside radius of line 19. Spoiler widths of approximately ¼ to 1/6 the diameter of the line 19 are employed, although other widths may be used. The thickness of the spoilers may vary depending upon the abrasiveness of the pulverized coal, however, approximately 3/16" to ½" has been found to be adequate for most applications. These metal spoilers may be fabricated from plates, bars, rods, tubing or the like. Carbon steel, stainless steel, or high abrasive-resistant steels suitable for high temperatures may be employed.

For the embodiment of the spoilers illustrated in FIGS. 2, 3 and 4, the spoilers are formed into a helical configuration. The direction of this helix is the same as that associated with the swirl of the primary air and pulverized coal. This swirl direction, by way of example, is illustrated by arrow 36 in FIG. 4.

In FIGS. 5 and 6 another embodiment of the spoilers is illustrated coupled to a primary air and fuel line 46 which line is equivalent to line 19 of FIGS. 1 through 4. Spoilers 47 are again coupled to the burner end of the line. In this embodiment the spoilers 46 are not helical, but rather are disposed at a constant angle with respect to the line 46. Again, the spoilers may be welded to the line 46, or may be part of a collar which is coupled to the end of the line.

The steam generator of FIG. 1 when including the spoilers, operates in a substantially conventional manner with the pulverized coal in line 19 being ignited in the burner 21. Secondary air needed to complete the combustion of the pulverized coal is provided via line 24. The flow of air and fuel into the furnace is controlled (generally as a function of demand) in a normal fashion.

Referring primarily to FIGS. 2 and 3, without the spoilers 37, the air and pulverized coal would be thoroughly and uniformly mixed since the pulverized coal would diverge from line 19 in an even pattern. However, with the spoilers 37 the pulverized coal is deflected and subsequently dispersed from line 19 in radial rays defined by the circumferentially spaced-apart spoilers 37, and in a fuel-rich core which is in general alignment with the line 19. Thus, local separation of the air/fuel mixture occurs which results in the formation of fuel-rich zones and air-rich zones. The local burning "inefficiency" caused by these fuel-rich and air-rich zones minimizes local adiabatic hot-spots of intense combustion. More of the near-burner (flame holding) combustion takes place in a fuel-rich environment. This reduction in intense, near burner adiabatic combustion reduces the formation of the nitric oxide. The spoilers, however, do not affect flame stability, nor do they cause excessive ash slagging on the furnace walls.

It is apparent that the above described spoilers may be readily incorporated into existing burners without substantial cost. Moreover, little or no maintenance is required on the spoilers, although it is anticipated that the spoilers may require periodic changing since the impinging pulverized coal will cause wear.

In FIGS. 7 and 8 another structure is illustrated for obtaining the fuel-rich and air-rich zones. In this alternate embodiment cross blockage is disposed within the end of the primary air and fuel line such as line 19 of FIGS. 1 and 2. In FIG. 7A the primary air and fuel line 49 includes cross blockage 50 which cross blockage has a generally circular cross section. The cross blockage may have a generally rectangular cross-section as shown as cross blockage 51 in FIG. 7B, or may be angled as shown by cross blockage 52 in FIG. 7C, or may have a contoured shape such as shown by cross blockage 53 in FIG. 7D.

The spoilers for providing the fuel-rich and air-rich zones may include slots which extend into the end of the primary air and fuel line. In FIGS. 9 and 10, a line 55 is shown which includes four slots 56 which extend into the interior of the line. For this alternate embodiment the slots 56 are generally parallel to the line 55. In FIGS. 11 and 12 tangential flow slots 60 are illustrated, these slots are similar to slots 56 of FIGS. 9 and 10, however, they are generally helical in shape to provide the tangential flow.

In FIGS. 13 through 16 scoop-like diverters are employed for providing the fuel-rich and air-rich zones. Each of these scoops terminates in an aperture which is disposed adjacent to the end of the primary air and fuel line. In FIGS. 13 and 14 the generally straight scoops 63 of line 62 terminate in apertures 64, while in FIGS. 15 and 16 the curved scoops 67 of line 66 provide a more tangential flow as the air emerges from the aperture 68. For the alternate embodiments of FIGS. 13 through 16 the larger coal particles are diverted by the scoops into the generally radial rays while the smaller coal particles remain within the central, axial core.

In FIGS. 17 and 18 a primary fuel and air line 69 is illustrated which includes a plurality of internal lines 70. Each of the lines 70 terminates in an aperture 71 which aperture passes through line 69. The lines 70 may be generally parallel to line 69 or may be curved for providing a more tangential flow to the coal particles as they leave the line 69.

Thus, a relatively simple apparatus has been described for reducing the formation of $NO_x$ in a pulverized fuel furnace. The apparatus in its presently preferred embodiment includes fingers or spoilers which extend into the wake of the pulverized coal as it is fed into the burner.

We claim:

1. In a burner for a pulverized coal furnace which includes a primary air and coal line ending in the throat of said burner, and a source of secondary air controllably fed into said burner, an improvement in said burner for reducing the formation of $NO_x$ comprising:
a plurality of finger-like spoilers coupled to and extending from the end of said primary air and coal line for disrupting the mixing of said coal and air so as to form coal-rich and air-rich radial zones and a coal-rich core, the number of said spoilers being selected so as to form said zones and core which tend to reduce the formation of $NO_x$, wherein said spoilers are circumferentially and uniformly spaced-apart about said burner end of said line and said number of said spoilers is no less than two and no more than six.

2. The improvement defined by claim 1 wherein said spoilers are helical in shape.

3. The improvement defined by claim 1 wherein said spoilers are at a constant angle relative to said line.

4. In a burner for a pulverized coal furnace which includes a primary air and coal line ending in the throat of said burner, and a source of secondary air controllably fed into said burner, an improvement in said burner for reducing the formation of $NO_x$ comprising:
a plurality of finger-like spoilers coupled to and extending from the end of said primary air and coal line for disrupting the mixing of said coal and air so as to form coal-rich and air-rich radial zones and a coal-rich core, the number of said spoilers being selected so as to form said zones and core which tend to reduce the formation of $NO_x$, wherein the length of said spoilers beyond the end of said primary air and coal line is between 0.5 and 1.5 times the diameter of said line.

5. In a burner for a pulverized coal furnace which includes a primary air and coal line ending in the throat of said burner, an improvement in said burner for reducing the formation of $NO_x$ comprising:
a plurality of finger-like spoilers coupled to and extending from the end of said primary air and coal line for disrupting the mixing of said coal and air so as to form coal-rich and air-rich radial zones and a coal-rich core, said spoilers being circumferentially and generally uniformly spaced-apart about said burner end of said line with the number of said spoilers being no less than two and no more than six.

6. The improvement defined by claim 5 wherein said spoilers are helical in shape.

7. The improvement defined by claim 6 wherein said spoilers are at a constant angle relative to said line.

8. In a burner for a pulverized coal furnace which includes a primary air and coal line ending in the throat of said burner, and a source of secondary air controllably fed into said burner, an improvement in said burner for reducing the formation of $NO_x$ comprising:
a plurality of finger-like spoilers coupled to and extending from the end of said primary air and coal line a distance between 0.5 and 1.5 times the diameter of said line for disrupting the mixing of said coal and air so as to form coal-rich and air-rich radial zones and a coal-rich core.

9. The improvement defined by claim 8 wherein said spoilers are circumferentially and uniformly spaced-apart about said burner end of said line with the number of said spoilers being no less than two and no more than six.

10. The improvement defined by claim 8 wherein each of said spoilers is disposed generally in alignment with said primary air and coal line.

11. The improvement defined by claim 8 wherein said spoilers are helical in shape.

12. In the coal furnace of claim 11 wherein the pulverized coal is swirling as it passes down said primary air and coal line, the improvement of claim 11 wherein said helical-shaped spoilers form helixes in the same direction as the direction of the swirl of the pulverized coal.

13. In the coal furnace of claim 11 wherein the pulverized coal is swirling as it passes down said primary air and coal line, the improvement of claim 11, wherein said helical-shaped spoilers form helixes in the same direction as the direction of the swirl of the pulverized coal.

14. The improvement defined by claim 11 wherein said spoilers define a constant angle with respect to said primary air and coal line.

* * * * *